United States Patent

Henckel et al.

Patent Number: 5,864,866
Date of Patent: Jan. 26, 1999

[54] APPARATUS AND METHOD FOR PROVIDING EXTERNALIZATION IN AN OBJECT-ORIENTED ENVIRONMENT

[75] Inventors: Jonathan David Henckel, Zumbro Falls; Charlie James Redlin; Peter John Schommer, both of Rochester, all of Minn.

[73] Assignee: International Business Machines Corporation, Armonk, N.Y.

[21] Appl. No.: 824,857

[22] Filed: Mar. 26, 1997

[51] Int. Cl.$^6$ .................................................. G06F 17/00
[52] U.S. Cl. ...................... 707/103; 707/102; 707/501; 345/356
[58] Field of Search ................. 707/1–206, 500–514; 345/356

[56] References Cited

U.S. PATENT DOCUMENTS

| | | | |
|---|---|---|---|
| 5,542,078 | 7/1996 | Martel et al. | 707/101 |
| 5,551,028 | 8/1996 | Voll et al. | 707/103 |
| 5,727,175 | 3/1998 | Malone | 345/356 |
| 5,778,356 | 7/1998 | Heiny | 707/2 |

*Primary Examiner*—Thomas G. Black
*Assistant Examiner*—David Yiuk Jury
*Attorney, Agent, or Firm*—Martin & Associates, L.L.C.; Derek P. Martin

[57] ABSTRACT

According to the present invention, an externalization service method for managing objects and state data related to the objects is disclosed. The present invention provides a method whereby objects with references to other objects can be stored in streams and can be referenced across processes, while maintaining the original object characteristics and relationships. The present invention is an extension to the existing Common Object Request Broker Architecture (CORBA) specification for externalization and can manage objects without the inherent limitations of known externalization methods. The objects of the present invention are managed by an object reference manager (reference manager) which is capable of storing and using state data and other object-related data to manage objects and the references to other objects. This information includes all information that is necessary to restore the object's characteristics, security access, state data, etc. when the object is recreated. Along with the improved functionality of the reference manager, several new methods are defined to implement improved externalization techniques for managing objects and their references.

20 Claims, 10 Drawing Sheets

APPARATUS AND METHOD FOR PROVIDING EXTERNALIZATION IN AN OBJECT-ORIENTED ENVIRONMENT

BACKGROUND OF THE INVENTION

1. Technical Field

The present invention relates in general to the data processing field. More specifically, the present invention relates to the field of Object Oriented programming techniques and mechanisms.

2. Background Art

The development of the EDVAC computer system of 1948 is often cited as the beginning of the computer era. Since that time, computer systems have evolved into extremely sophisticated devices. Modem computer systems contain relatively complex software that the computer hardware executes in order for the computer system to perform its intended functions. As the complexity of computer hardware and software increases, the need to efficiently and effectively develop new software becomes more acute. Software development costs have continued to rise because complex programs take more time, and hence more money, to produce. Object-oriented programming is one way computer programmers have sought to reduce the time and costs associated with developing complex software.

The goal of using object-oriented programming is to create small, reusable sections of program code known as objects that can be quickly and easily combined and re-used to create new programs. This is similar to the idea of using the same set of building blocks again and again to create many different structures. The modular and re-usable aspects of objects will typically speed development of new programs, thereby reducing the costs associated with development. In addition, by creating and re-using a group of well-tested objects, a more stable, uniform, and consistent approach to developing new computer programs can be achieved.

Typically, object-oriented software programs or processes create and use objects to accomplish the required or desired goals of the application software. Most software processes will create an object or objects and then use those objects during the processing cycle for that particular process. Once the software process that created the object has completed its processing requirements, the objects associated with that process are removed from memory. This means that the objects created and used by one process are not typically accessible by subsequent processes because the objects have been destroyed.

It is sometimes desirable to have an object created by one program process available to other program processes, even after the process that created the object has ceased to run. This type of an object is known as a "persistent" object. A persistent object can be stored on a disk or other secondary memory storage device. Then, when the creating process is terminated, the persistent object remains in secondary storage and can be accessed by a subsequent process. By using a persistent object, a copy of an existing object can be stored and then retrieved at a later time and used to create a new object, after the original object is destroyed. While the new object is not technically the same object, the new object will have the same characteristics and attributes as the original object. The use of persistent objects permits certain types of information to be shared between disparate processes.

"Externalization" is the means or protocol used in object-oriented programming for transferring data into and out of an object, including persistent objects. The externalization process is accomplished using memory areas which are defined as "streams". Externalization procedures can be used to "stream" or transfer data from a streamable object to a memory location and thereby preserve the data and characteristics associated with the streamable object. This data can then be internalized at a later time into a new object and made available to other processes that may need to use the original streamable object. Streams are typically implemented using files or memory buffers as a memory area for storing object-related information from a streamable object.

Figure 3:
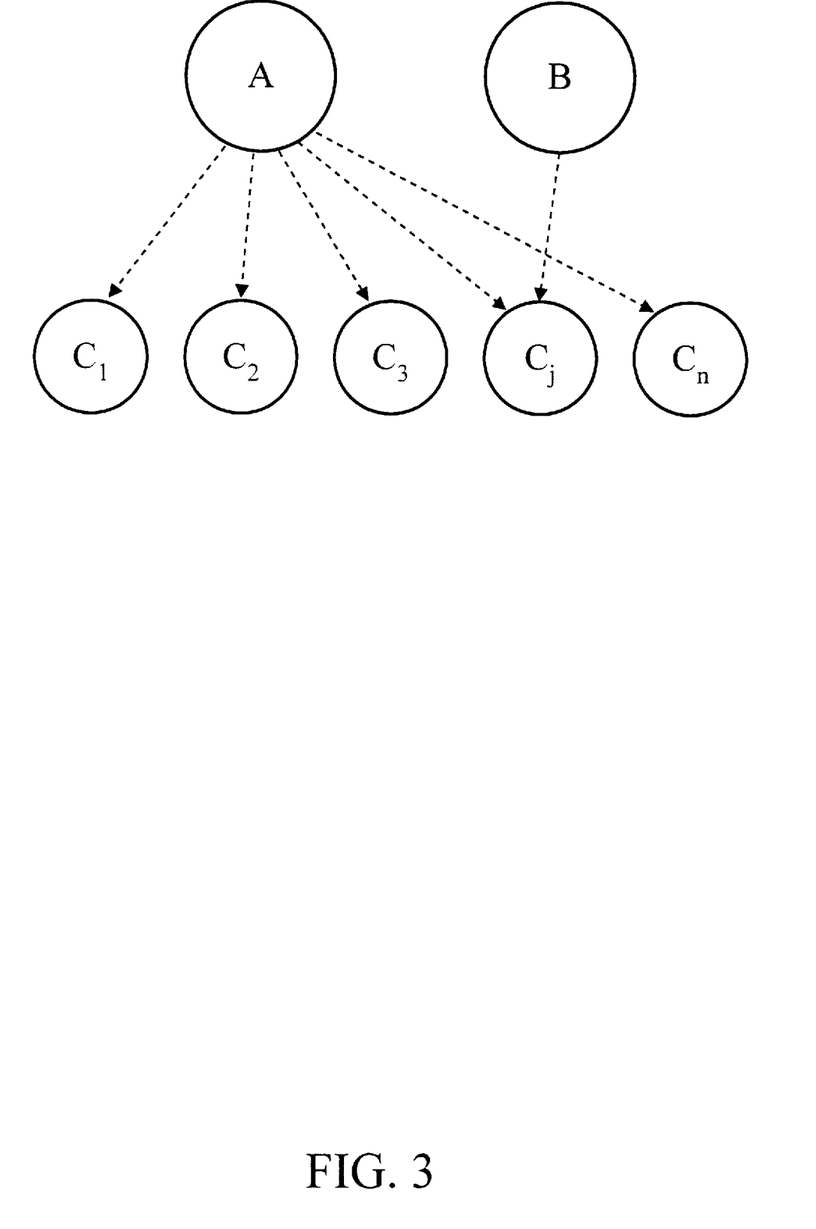
FIG. 3 is a block diagram of object references and relationships that illustrate a problem with known persistent object externalization methods.

While existing externalization protocols recognize persistent objects, current externalization procedures provide only limited support for creating and managing persistent objects and references. In the current implementation of externalization, in order for persistent objects to maintain references to other objects, all of the data and references associated with a given object must be stored in a single stream. For example, referring now to FIG. 3, one problem with the existing implementation of persistent objects is illustrated. In FIG. 3, object A is a persistent or streamable object which references objects $C_1$–$C_n$. Object B is a non-streamable object which references object $C_j$. In this case, if object A is externalized using a standard externalize command, all of the contents referenced by A (objects $C_1$–$C_n$) must also be externalized into a single stream. When the process that created object A has run to completion, the original object A is destroyed or removed from memory. Then, when object B requires access to object $C_j$, the entire contents of object A must be retrieved and internalized into a new object. While this procedure may be possible in certain instances, if the amount of data represented by objects $C_1$–$C_n$ is sufficiently large, then system memory constraints may become a limiting factor. This is particularly true if there are multiple objects (like object B) that each maintain independent references to multiple individual objects (like object $C_j$) that are also referenced by object A. Even if the memory space is large enough to hold all of the information contained in $C_1$–$C_n$, loading unnecessary information into memory is a highly inefficient use of limited computer resources.

Figure 4:
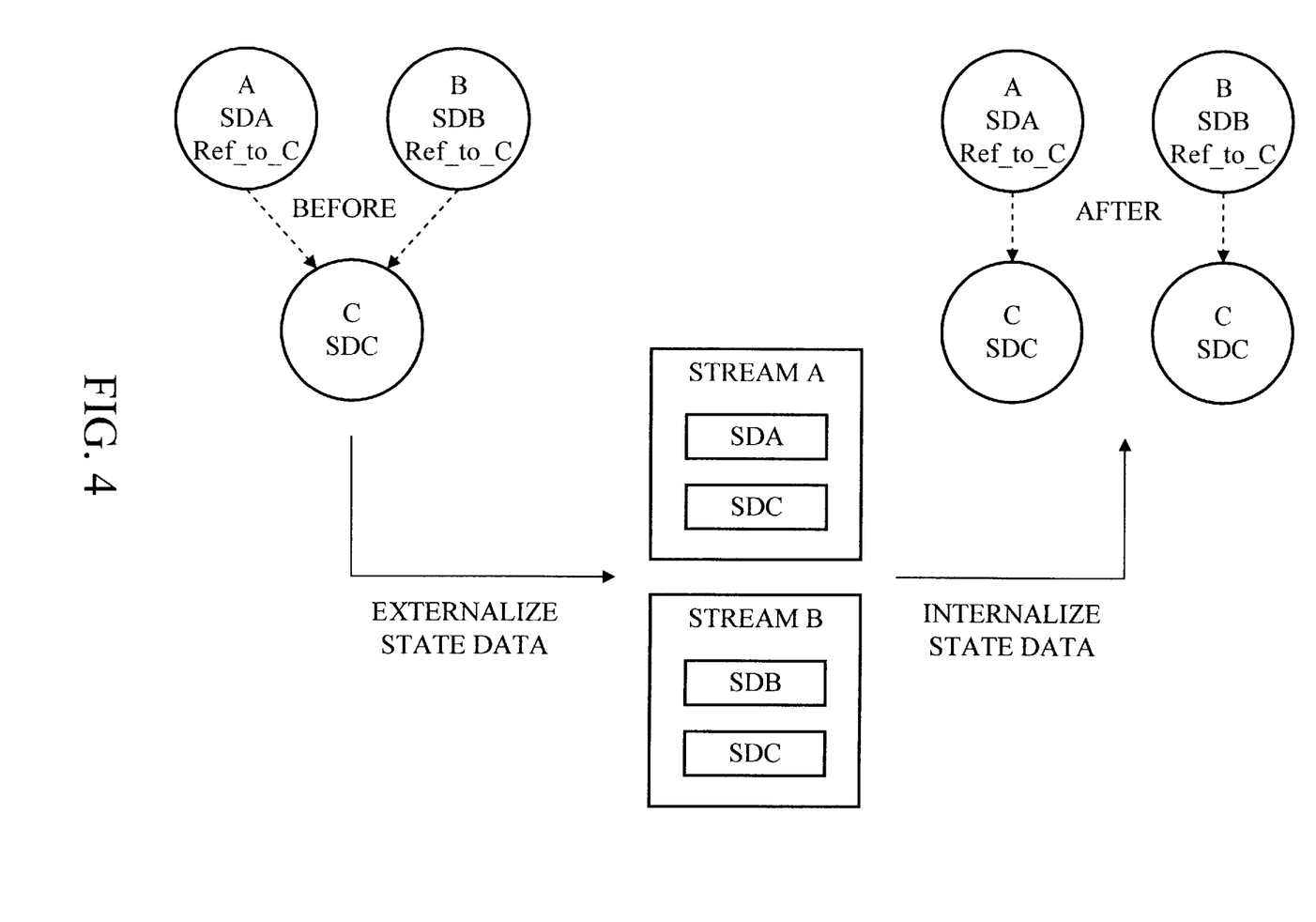
FIG. 4 is a block diagram of object references and relationships that illustrate a problem with known persistent object externalization methods.

Referring now to FIG. 4, another problem with current externalization procedures is illustrated with the concept of state data. The type of data that can be streamed from a streamable object during the externalization process typically includes "state data", which is the information regarding the characteristics of the object when the object's contents are externalized. For the purposes of this specification, the term "state data" will be broadly construed to include other object-related data. This would include object security access characteristics, pointers to other objects, etc. In FIG. 4, object A contains the state data for object A (SDA) and also contains a reference to object C which contains the state data for object C (SDC). Similarly, object B contains the state data for object B (SDB) and also contains a reference to object C. Object C "supports" persistent references. When object A is externalized, SDA and SDC are stored in stream A. Likewise, when object B is externalized, SDB and SDC are stored in stream B. Then, when a later process requires access to objects A and B, the data in stream A is internalized into a new object A and the data in stream B is internalized into a new object B. Since both streams recognize a reference to object C, two new and separate objects are created, each as object C. This is problematic for several reasons. First of all, the memory storage and allocation concerns are obvious. Twice as much memory is required for creating and storing two objects, both identified as object C. More troubling is the fact that object A and object B no longer reference the same object C. The original relationship between the three objects has been altered. Depending on the nature of the original relationship, the new objects may no longer function together as intended.

As the complexity of both computer hardware and software increases, the need for better ways of implementing persistent objects becomes more apparent and more acute. This is especially true as more and more computers are connected by networks such as the World Wide Web and share information across different computer systems. Without an improved mechanism for implementing persistent objects the computer industry will be hindered from taking full advantage of implementing and using persistent objects across different processes.

DISCLOSURE OF INVENTION

According to the present invention, an externalization service method for managing objects and state data related to the objects is disclosed. The present invention provides a method whereby objects with references to other objects can be stored in streams and can be referenced across processes, while maintaining the original object characteristics and relationships. The present invention is an extension to the existing Common Object Request Broker Architecture (CORBA) specification for externalization and can manage objects without the inherent limitations of known externalization methods. The objects of the present invention are managed by an object reference manager (reference manager) which is capable of storing and using state data and other object-related data to manage objects and the references to other objects. This information includes all information that is necessary to restore the object's characteristics, security access, state data, etc. when the object is recreated. Along with the improved functionality of the reference manager, several new methods are defined to implement improved externalization techniques for managing objects and their references.

BEST MODE FOR CARRYING OUT THE INVENTION

The present invention relates to object-oriented programming techniques. For those individuals who are not generally familiar with object-oriented programming, the Overview section below presents many concepts that will help to understand the present invention. Individuals skilled in the art of object-oriented programming may wish to skip the Overview section and proceed directly to the Detailed Description section of this specification.

1. Overview

Object-oriented Technology v. Procedural Technology

Object-oriented programming is a programming paradigm in which programs are organized as cooperative collections of objects, each of which represents an instance of some class, and whose classes are all members of a hierarchy of classes united via inheritance and other various relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects. Said another way, object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code that provide one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation, that internal implementation can change without affecting other aspects of the program.

In this way the object system isolates the requester of services (client objects) from the providers of services (server objects) by a well-defined encapsulating interface. Thus, in the classic object model, a client object sends request messages to server objects to perform any necessary or desired function. The message identifies a particular server object and specifies what method is to be performed by the server object, and also supplies any required parameters. The server object receives and interprets the message, and then performs the requested service.

Because all operations on an object are expressed as messages sent from one object to another, methods can be called by remote objects. Objects that reside in different locations and that are capable of sending messages back and forth to each other across a network are called distributed objects.

Another central concept in object-oriented programming is the class. A class is a template or prototype that defines a type of object. A class outlines the makeup of objects that belong to that class. By defining a class, objects can be created that belong to the class without having to rewrite the entire definition for each new object as it is created This feature of object-oriented programming promotes the reusability of existing definitions and promotes efficient use of program code.

There are many computer languages that presently support object-oriented programming techniques. For example, Smalltalk, Object Pascal, C++ and Java are all examples of programming languages that support object-oriented programming to one degree or another.

The Object Management Group (OMG) is a standards group formed by a large alliance of software companies to help standardize object software. The goal of the group is to provide specifications that form a common framework for object-based application development. This reduces the complexity and lowers the cost of introducing new or enhanced object-based software applications. The Common Object Request Broker Architecture (CORBA) is an OMG specification designed to provide a framework for the sharing of objects across a wide variety of hardware platforms and operating systems. CORBA allows applications to communicate with one another regardless of location or vendor. In particular, CORBA defines inter-operability by specifying the design and interaction behavior of Object Request Brokers (ORBs) such that ORBs from different vendors can effectively communicate and inter-operate with each other. This has been accomplished by defining the application interface protocol in a language-independent specification. Detailed information on the OMG and the CORBA specification is available on the World Wide Web at http://www.omg.org. Some of the more relevant CORBA-related concepts, services, and methods are described below.

CORBA Life Cycle Service defines services and conventions for creating, deleting, copying, and moving objects. Because CORBA-based environments support distributed objects, the Life Cycle Service defines conventions that allow client objects to perform life cycle operations on objects in different locations. One of the methods offered by the Life Cycle Service is the factory finder interface. In object-oriented environments, objects are created by "factories". The factory finder is used to find the factory which is used to create objects of a particular class. The CosLifeCycle::Key is a data structure which is used to identify the various factories that can create specific types of objects. Keys typically contain the name of the object class. Once the appropriate factory object has been found, then the desired object can be created by invoking a create( ) method on the factory object. Detailed documentation on the Life Cycle Service is available on the World Wide Web at http://www.omg.org/library.

Another important application program that is used in a typical object-oriented environment is known as the Object Request Broker (ORB). The ORB establishes client-server relationships between various objects. ORBs are a well known technology that allows an application on one machine to invoke methods on objects that reside on another machine. ORBs provide the infrastructure that allows objects to converse with each other, independent of the specific platforms and techniques used to implement the various objects. Using an ORB, a client object can transparently invoke a method on a server object, whether the server object is located on the same machine or on a different machine connected via a network. The ORB operates by intercepting method calls and finding an object that can implement the request, passing the request parameters to the object, invoking the method, and returning the results. While doing so, the client need not be aware of where the object is located, the programming language of the object, the operating system of the object, or any other system-related aspects. Thus, the ORB provides inter-operability between applications on different machines in heterogeneous distributed environments and seamlessly interconnects multiple object systems.

To implement a system, the client must be initialized to work with the object servers. With a standard ORB on a standard client, the ORB program files are installed on the client during the ORB installation routine. One of these program files is generically called an "initial object reference". An object reference is a set of data that identifies a particular process running on a particular machine that contains a particular object. Such an object reference is used as an unique identifier to distinguish the identified object from other objects. Typically, an object reference is a binary number comprising an object identifier prepended or concatenated with the Transmission Control Protocol/Internet Protocol (TCP/IP) address of the machine on which the object resides and the TCP/IP port number of the process in which that object resides.

CORBA also defines a reference manager that provides many services for managing objects. For the purposes of this invention, two of the more relevant methods provided by the CORBA reference manager are "string_of_object( )" and "object_to_string( )". An object reference that has been converted to a string may be referred to as a "stringified reference". Because an object reference may differ from ORB to ORB, the object reference itself is not a convenient value for storing references to objects in persistent storage environments. Given this background, two problems must be solved: 1) allowing an object reference to be turned into a value that a client can store in some other medium, and 2) ensuring that the value can subsequently be turned into the appropriate object reference. An object reference may be translated into a string by the method object_to_string( ). The value may be stored or communicated in whatever ways strings are typically manipulated. Subsequently, the string_to_object( ) method will accept a string produced by the object_to_string( ) method and will return the corresponding object reference.

As specified by CORBA, references to objects can be classified as "transient" references or "persistent" references. Transient references are defined as object references that are created within a process and that can be accessed by another process. Using the CORBA specification for transient references, a "proxy" or copy of the original object can be transferred to another process to allow both processes to simultaneously access the same object. However, with a transient reference, when the instantiating process ceases to run, then both the original object and the proxy object are invalid and cannot be referenced by other processes.

Persistent references are defined within the CORBA specification and are, theoretically at least, capable of transferring data between processes. With a persistent reference as presently defined by CORBA, the server can re-create the referenced object when required, using the persistent object reference. The reference manager discussed above is used to track and handle the access requests for persistent references. However, the current implementation of the CORBA specification does not provide a complete solution because, although the persistence reference manager can recreate the referenced object, the state data that was originally contained within the referenced object is not referenced by the existing CORBA reference manager.

Systems which implement persistent references will typically use a database file known as an "object reference database" to periodically store information regarding the objects and references used in the server processes, in the object reference database. In addition, the system stores all of the object references during standard server shutdown procedures. The object reference database file contains information such as the class name for the objects and also includes their individual universally unique identifiers (uuid). The uuid is a random number supplied by the CORBA Identity Service. This information is typically available in persistent reference systems and can be used to reconstruct an object. Similar to the discussion above in the context of object references, the state data of an object may also be characterized as either persistent state data or transient state data.

The CORBA Persistent Object Service (POS) is a service that provides common interfaces to the mechanisms used for retaining and managing the persistent state of objects. Using this service, the state data for a persistent object can be stored. Each object ultimately has the responsibility of managing its state, but can use or delegate to the Persistent Object Service for the actual work. There is no requirement that any object use any particular persistence mechanism. The Persistent Object Service provides the conventions clients can use to control a object's persistence to achieve certain types of flexibility in system design. The POS provides several components that can be used to implement persistent objects. Some of the more relevant components include the Persistent Object (PO), the Persistent Identifier (PID), and the Persistent Data Service (PDS). The PO is an object whose persistence is controlled externally by its clients. The PID describes the location of an object's persistent data in some storage location and generates a string identifier for that data. The PDS is a component that provides a uniform interface for any combination of data storage and protocol for transferring data into and out of an object and also coordinates the basic persistence operations for a given object. A PO can send the PID to the PDS to store or retrieve the persistent data that relates to the PO.

Figure 5:
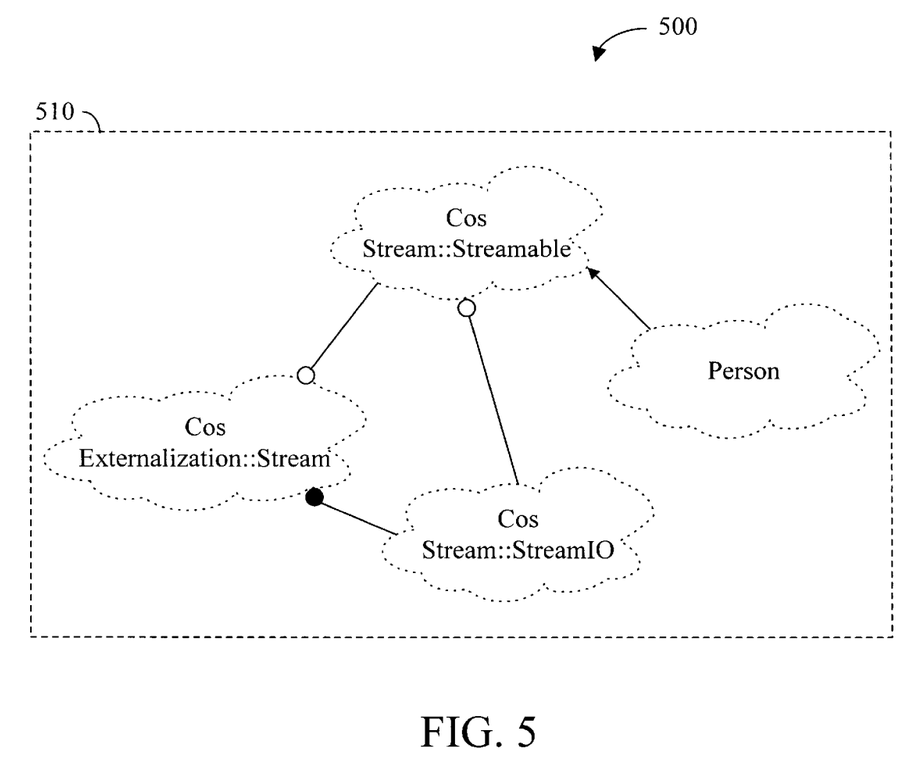
FIG. 5 is a class diagram representation of the present CORBA implementation of an externalization framework for persistence integration.

Referring now to FIG. 5, a class diagram 500 representing the existing externalization framework for persistence integration according to the CORBA specification is presented. This class diagram illustrates the relationship between the various components 510 that serve to provide externalization and persistence services for objects in a typical object-oriented environment. Class diagram 500 is presented to illustrate the differences between the existing CORBA architecture and the present invention as described below in conjunction with FIG. 6. As mentioned above, detailed information on the CORBA specification is available on the World Wide Web at http://www.omg.org/library.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

2. Detailed Description

According to the present invention, an externalization service method for managing objects and state data related to the objects is disclosed. The present invention provides a method whereby objects with references to other objects can be stored in streams and can be referenced across processes, while maintaining the original object characteristics and relationships. The present invention is an extension to the existing Common Object Request Broker Architecture (CORBA) specification for externalization and can manage objects without the inherent limitations of known externalization methods. The objects of the present invention are managed by an object reference manager (reference manager) which is capable of storing and using state data and other object-related data to manage objects and the references to other objects. This information includes all information that is necessary to restore the object's characteristics, security access, state data, etc. when the object is recreated. Along with the improved functionality of the reference manager, several new methods are defined to implement improved externalization techniques for managing objects and their references.

Figure 1:
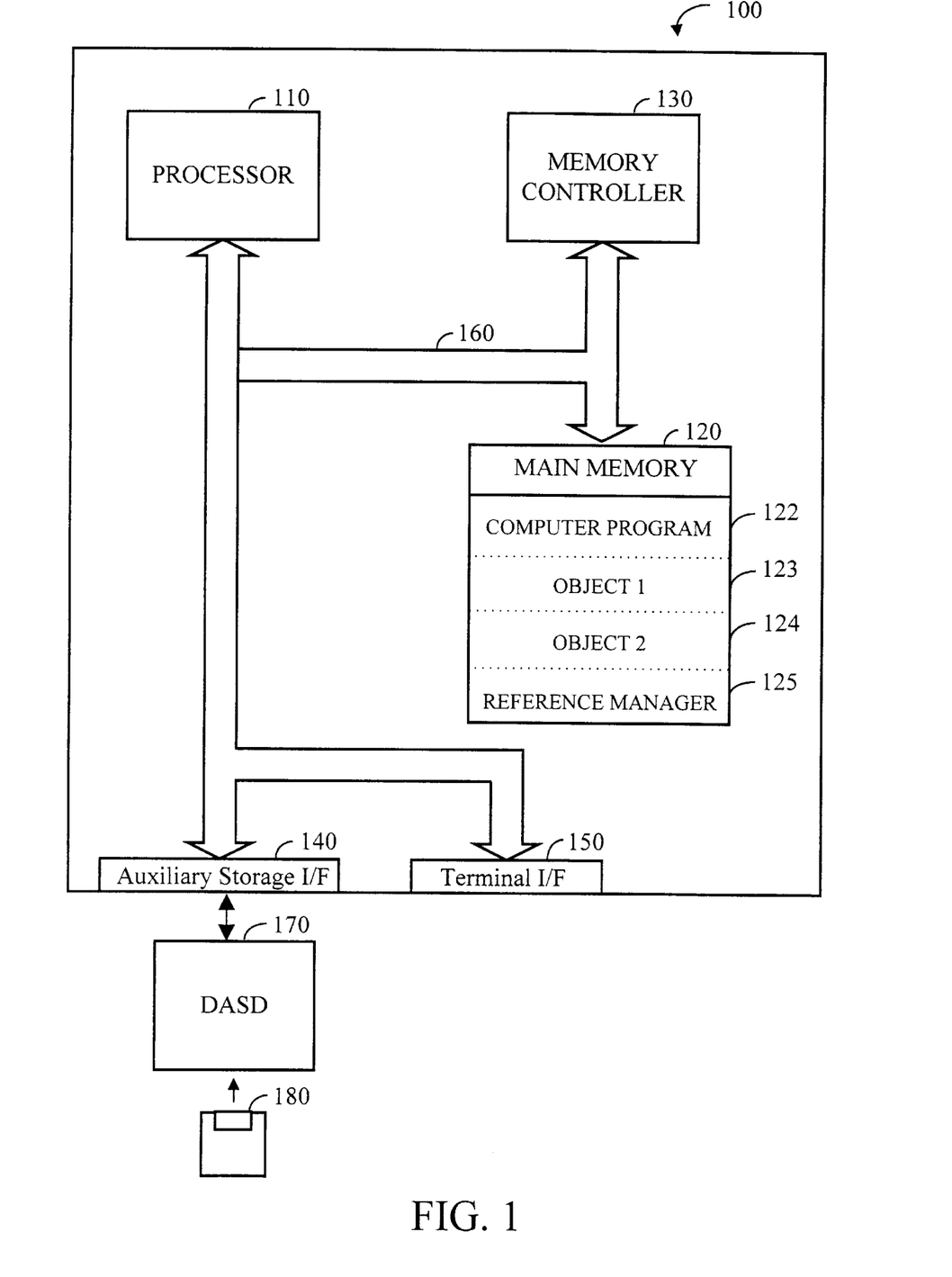
FIG. 1 is a block diagram representation of a system according to a preferred embodiment of the present invention.

Referring to FIG. 1, a computer system 100 in accordance with the present invention is an IBM P/S 2 computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

Processor 110 performs computation and control functions of computer system 100, and comprises a suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes An object-oriented computer program 122 within main memory 120.

Auxiliary storage interface 140 is used to allow computer system 100 to store and retrieve information from auxiliary storage, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links.

Memory controller 130, through use of a processor separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains one or more computer programs 122, a first object 123, a second object 124, and a reference manger 125. Computer program 122 in memory 120 is used in its broadest sense, and includes any and all forms of computer programs, including source code, intermediate code, machine code, and any other representation of a computer program. Computer program 122 may also represent the operating system for processor 110. Objects 123 and 124 are created and manipulated by some portion of computer program 122 and, as explained below, will be treated as related objects in that one object will typically have a persistent reference to the other object. In a preferred embodiment of the present invention, reference manager 125 is used to manage the relationship and characteristics of objects 123 and 124 and to implement persistence functions for objects 123 and 124.

It should be understood that main memory 120 will not necessarily contain all parts of all mechanisms shown. For example, portions of computer program 122 may be loaded into an instruction cache (not shown) for processor 110 to execute, while other files may well be stored on magnetic or optical disk storage devices (not shown). In addition, although computer program 122 is shown to reside in the same memory location as reference manager 125 and objects 123 and 124, it is to be understood that main memory 120 may consist of disparate memory locations.

Figure 2:
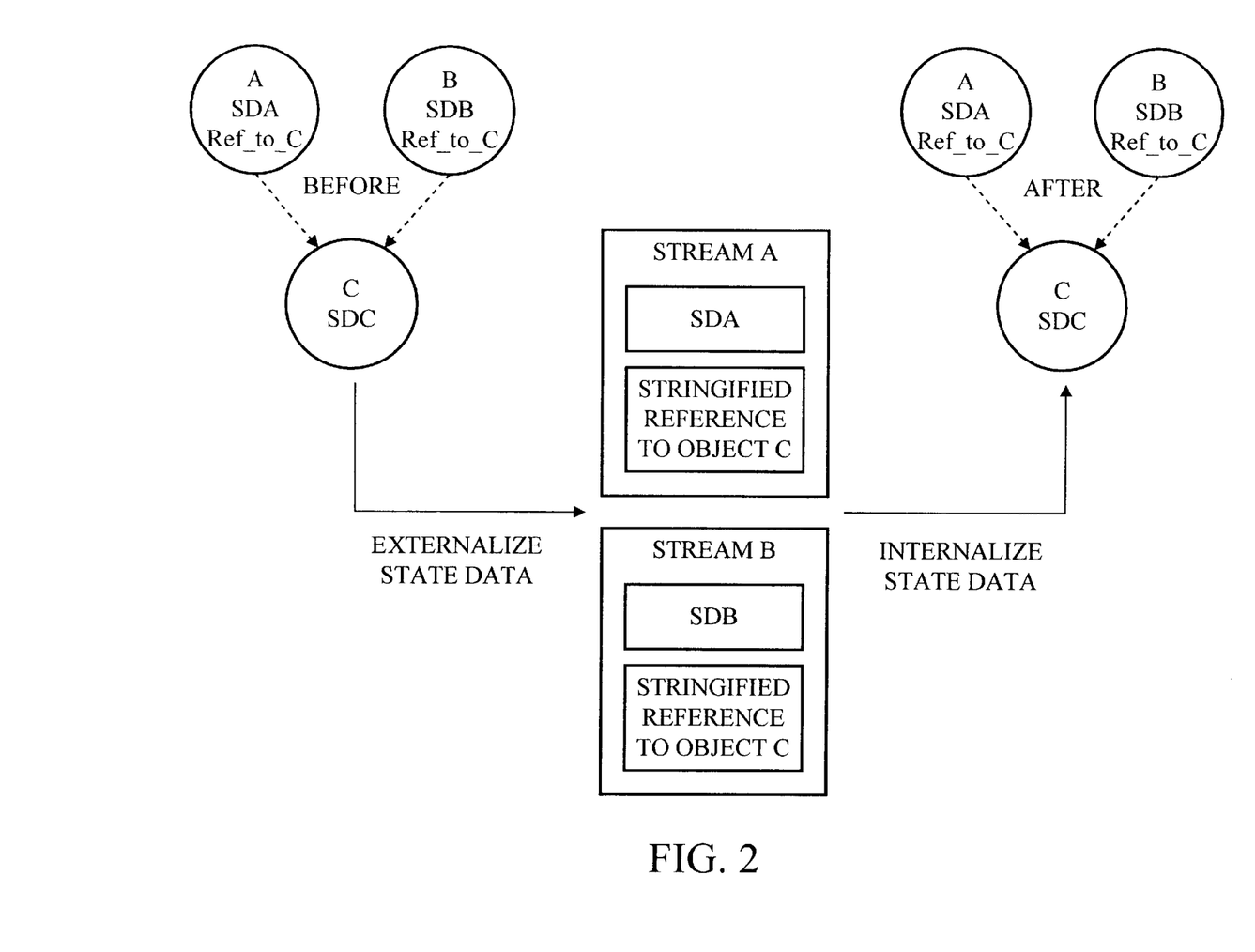
FIG. 2 is a block diagram representation of a persistent object externalization method according to a preferred embodiment of the present invention.

Referring now to FIG. 2, a preferred embodiment of the present invention is illustrated in a typical object externalization/internalization scenario. In FIG. 2, a reference manager is used to handle the externalization and internalization of object references where it is necessary to preserve an objects's state data and recreate analogous persistent objects for later use. The present invention uses an adaptation of the reference manager as defined in the CORBA specification. In FIG. 2, object A and object B both have a reference to object C. When the server for object A and object B is to be shut down, object A and object B are "passivated" or removed from memory. According to the present invention, during the externalization process, the state data of object A and a stringified object reference to object C are written to stream A. Similarly, the state data of object B and a stringified object reference to object C are written to stream B.

Later, when the server for object A and object B is restarted or when another process requests access to object A or object B, object A and object B can be recreated from the state data contained in stream A and stream B. The state data from stream A and stream B is internalized into two new objects which will have the same state as the original object A and object B. In addition to recovering the state data for object A and object B, the stringified object reference to object C allows object C to be recreated and also allows the relationship between object A, object B, and object C to be reestablished.

A reference manager in accordance with a preferred embodiment of the present invention can store object-related data in the object reference database for each reference. This information includes the state data for the object and the relevant address information to locate the state data at a later time. This information is not used directly by the reference manager but the reference manager maintains access to the data for the sake of properly restoring the attributes of the referenced objects. For example, whenever the server is doing a shutdown, the reference manager calls a special method, uninit_for_object_passivation( ), on every persistent-reference object currently residing in memory. The uninit_for_object_passivation method takes a parameter that is a pointer to the data structure, and each persistent-reference object is expected to add whatever data is needed (to later restore itself to the data structure. When all the objects have updated their respective data, then the object reference table (containing the data) is written to a database on secondary storage, and then the server process terminates. At a later time when the server process is started once again, it reads the object reference table from the database. The server does NOT immediately recreate all the object in memory again, but rather it waits until any reference to that object is required either by proxies elsewhere on the ORB or by other objects within the local server process.

Figure 6:
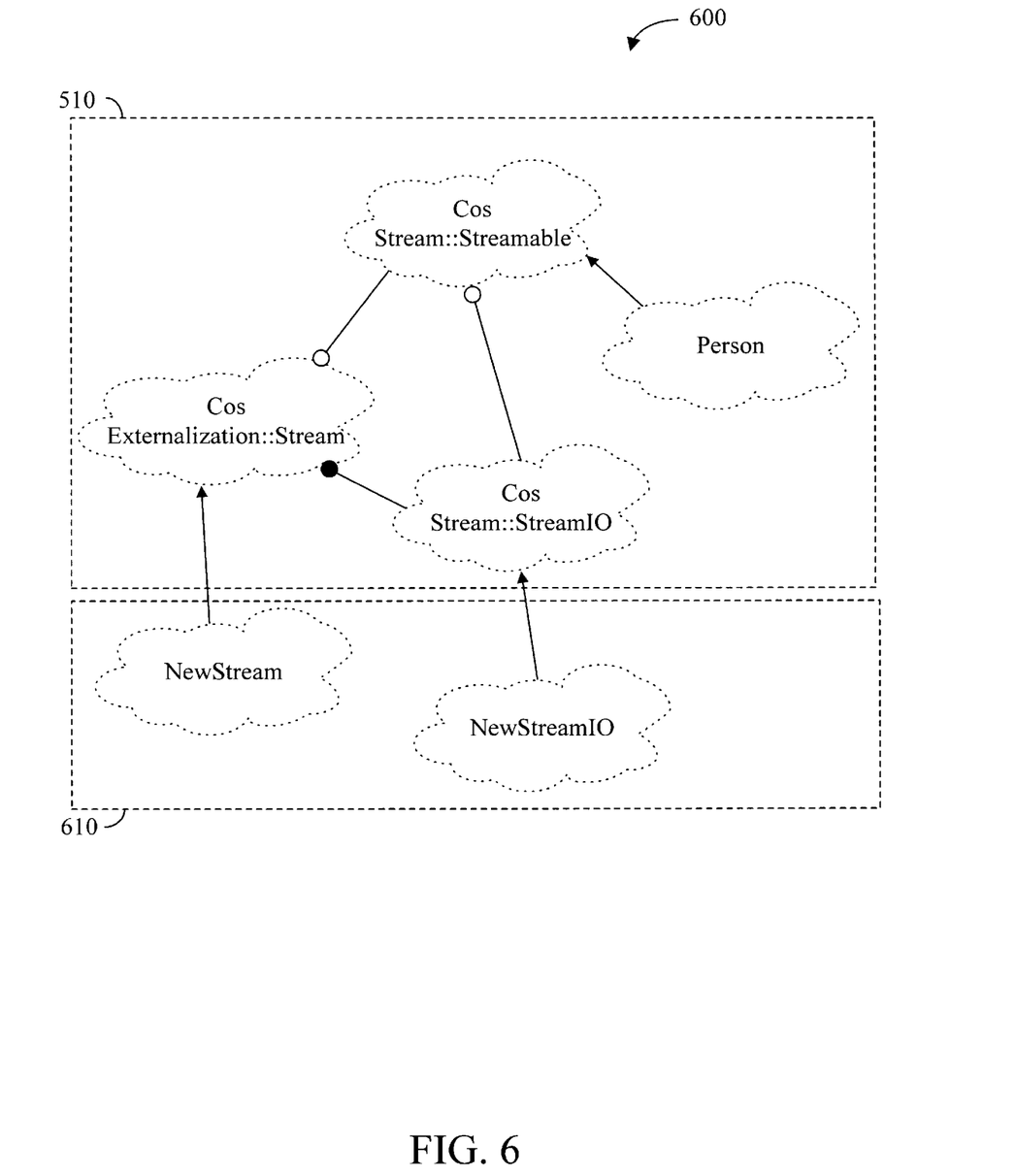
FIG. 6 is a class diagram representation of an extension to the externalization framework for persistence integration according to a preferred embodiment of the present invention.

Referring now to FIG. 6, a class diagram 600 for an externalization framework for persistence integration in accordance with a preferred embodiment of the present invention is presented. This class diagram details the extension 610 of the existing CORBA framework for externalization and includes two new classes that are not used in the CORBA architecture as shown in FIG. 5, above. These new classes are NewStream and NewStreamIO. These new classes are used to implement the preferred embodiments of the present invention. Working in conjunction with the reference manager described earlier, the present invention creates an extension to the externalization framework for persistence integration, which is different than the currently defined CORBA framework. The NewStream class replaces the existing CORBA CosExternalization::Stream class and is provided to handle stringified references for externalization so as to recreate state data for persistent objects. The NewStreamIO class supports writing stringified references to streams and buffers during the externalization process. The NewStream class also supports a new method, the "externalize_ref( )" method which handles contained objects differently than the CORBA CosStream::StreamIO.

Figure 7:
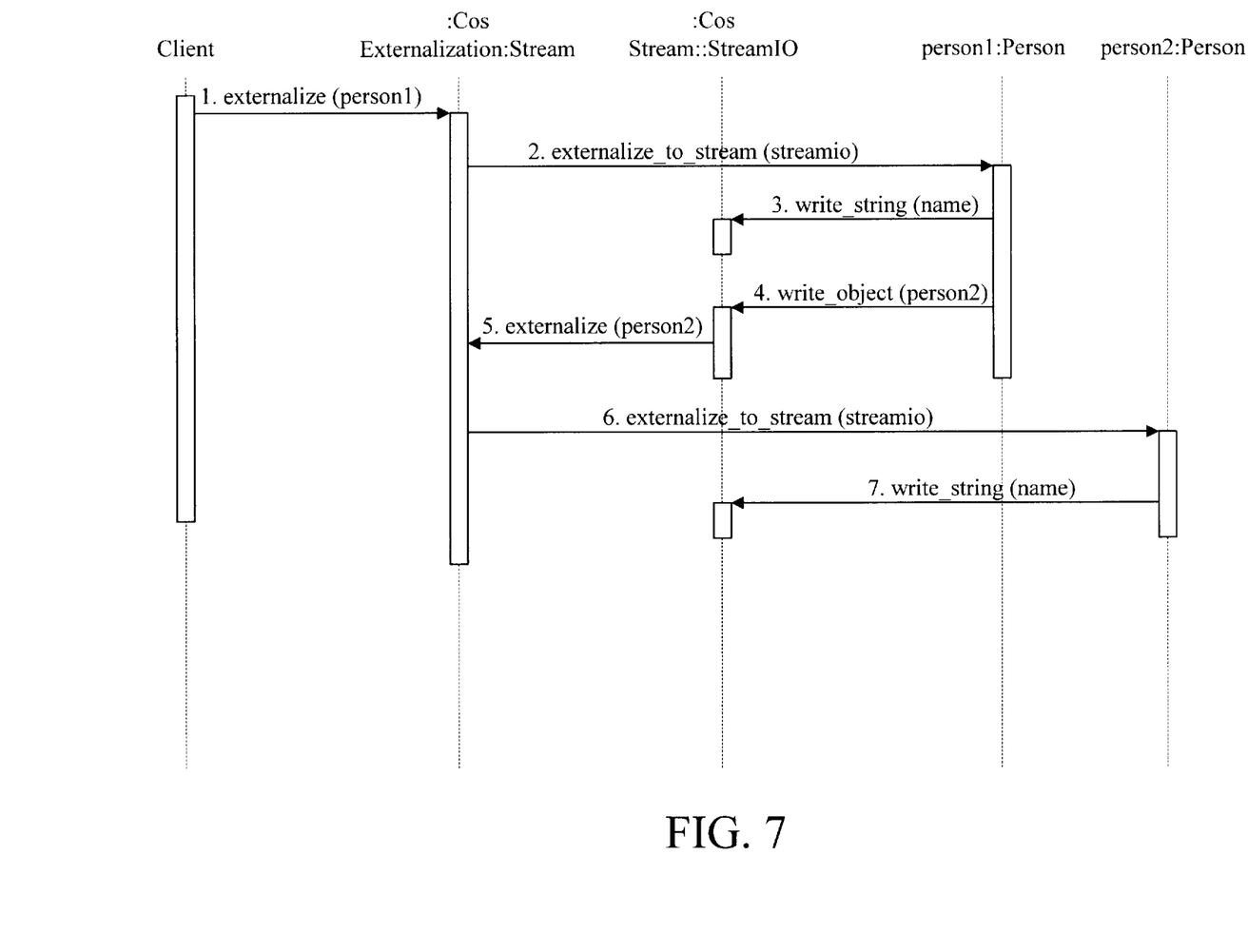
FIG. 7 is an interaction diagram which illustrates the current externalization procedures of CORBA.

Referring now to FIG. 7, an activity diagram for an externalization method according to the current CORBA specification is presented. The CORBA specification describes this process in detail and the existing externalization process is well known to those skilled in the art. Detailed information on the CORBA specification is available on the World Wide Web at http://www.omg.org/library.

Figure 8:
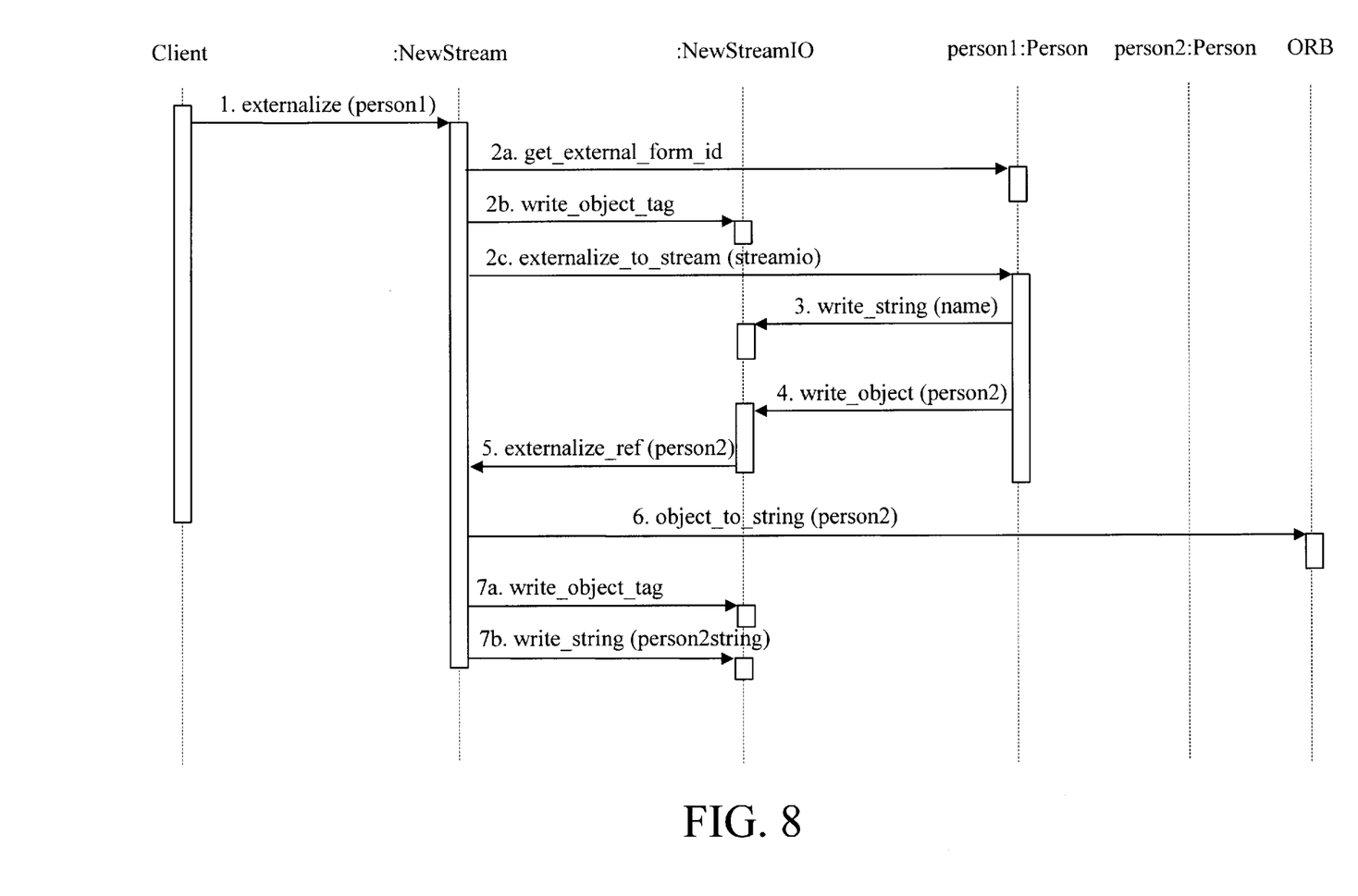
FIG. 8 is an interaction diagram which illustrates an externalization procedure in accordance with a preferred embodiment of the present invention.

Referring now to FIG. 8, an activity diagram for an externalization method according to a preferred embodiment of the present invention is illustrated. In FIG. 8, person1 and person2 represent two separate objects, where both objects are instances of the Person class. The Person class inherits from the "mix-in" class, CosStream::Streamable (see FIG. 6). This means that the objects are streamable objects and that the objects can be externalized. The person1 object contains a pointer (internal reference) to the person2 object. In a typical application, the pointer may represent a relationship between the two objects, such as parent/child or supervisor/subordinate. In addition, both objects have unique identifying names, which are typically represented as string data items.

Step 1. The client (the part of the program written by the user of the externalization framework) has a reference to the person1 object and a reference to a NewStream object and decides to externalize the person1 object to a stream. The client invokes the externalize( ) method on the NewStream passing the person1 object as the parameter. In this example, the NewStream::externalize( ) method is the same implementation as presented in the CORBA defined CosExternalization::Stream::externalize( ) method.

Step 2. First the externalize( ) method gets the class name from the person1 object in the form of a CosLifeCycle::Key by calling the get external_form_id( ) method on the person1 object. The externalize method writes the Key to the stream by calling the write_object_tag method on the NewStreamIO object. This header information is useful when the object is read from the stream later. Then, the externalize method simply calls the externalize_to_stream( ) method on the Streamable object, in this case, the person1 object, and passes the NewStreamIO object. It should be noted at this point that every NewStream object contains a NewStreamIO object and the NewStreamIO also contains a pointer to its owning NewStream object. These two objects perform different roles in providing the complete "stream" functionality. Basically, the Stream class encapsulates the "client interface" and "object semantics" and the StreamIO encapsulates the "service interface" (called by the Streamable object class, not the client) and the "data storage" implementation (i.e. the location of the file or buffer in memory).

Step 3. The externalize_to_stream( ) method is declared by the Streamable class. However, since this is an abstract mix-in class, the externalize_to_stream( ) method is not implemented at this level. The externalize_to_stream( ) method must be implemented in each class that inherits from the Streamable class, which in this case is the Person class. The implementation of the externalize_to_stream( ) method in the Person class calls two things (because the Person contains two data members). First, write_string( ) is called to write the name of the person to the StreamIO and then write_object( ) is called to write the reference (to the person2 object) to the StreamIO. The write_string( ) method in NewStreamIO simply puts the string into the buffer and then returns.

Step 4. The write_object( ) method, used in conjunction with NewStreamIO, is a slightly different implementation of the CORBA CosStream::StreamIO::write_object( ) method. The CORBA method would call externalize( ) on the Stream object. The NewStreamIO::write_object( ) method instead calls a new externalize_ref( ) method on the NewStream object. This implementation has been selected because the NewStream method treats "top level" objects (i.e. those coming directly from the client object) differently from "embedded" objects, (i.e. those contained within the top level objects).

Step 5. The NewStream::externalize_ref( ) method may be implemented in several different ways which results in various "object semantics". The externalize_ref( ) method can (a) write the state data of the object to the stream (using write_object_tag and externalize_to_stream as in step 2 above) or (b) it can write only a stringified reference to the object to the stream, or (c) the externalize_ref can write both the state data of the object and a stringified reference to the object to the stream, or (d) the externalize_ref can do any of the above dependent upon the nature of the object. For example, if the object passed to externalize_ref( ) supports persistent references, then it might be desirable to implement the externalize_ref( ) method as described in (b) or (c) above. However, if the object does not support any persistent references, then it might be better to implement the externalize_ref( ) method as described in (a) or (c) above. In a preferred embodiment of the present invention, these various options should all be left available to the client based on the design requirements of the application being developed. In the example shown in FIG. 8, option (b) is used as a preferred embodiment. The NewStream method calls the object_to_string( ) function on the reference manager of the person2 object.

Step 6. The reference manager object_to_string( ) method constructs a string by concatenating a a CORBA-defined prefix and server name followed by information about the person2 object such as the class name, the timestamp, a memory location, and the uuid for the object. Then the reference manager returns the string to the externalize_ref( ) method.

Step 7. After the externalize_ref( ) method receives the stringified reference to the person2 object, it writes a "tag" to the stream by calling write object tag( ) on the NewStreamIO object. The tag indicates that the stream contains only the stringified reference of the object (and not the state data of the object). Finally, the externalize_ref( ) method calls the write_string( ) method to write the stringified reference to the stream buffer.

At this point in the process, the original two objects, person1 and person2, may be removed from memory. One reason these objects may be removed from memory would be that the server process which supported the two objects was shut down. After the objects have been removed from memory, they can be recreated or "reactivated" when the relevant server process is restarted. This may occur as part of a client request or some other re-initialization process.

Figure 9:
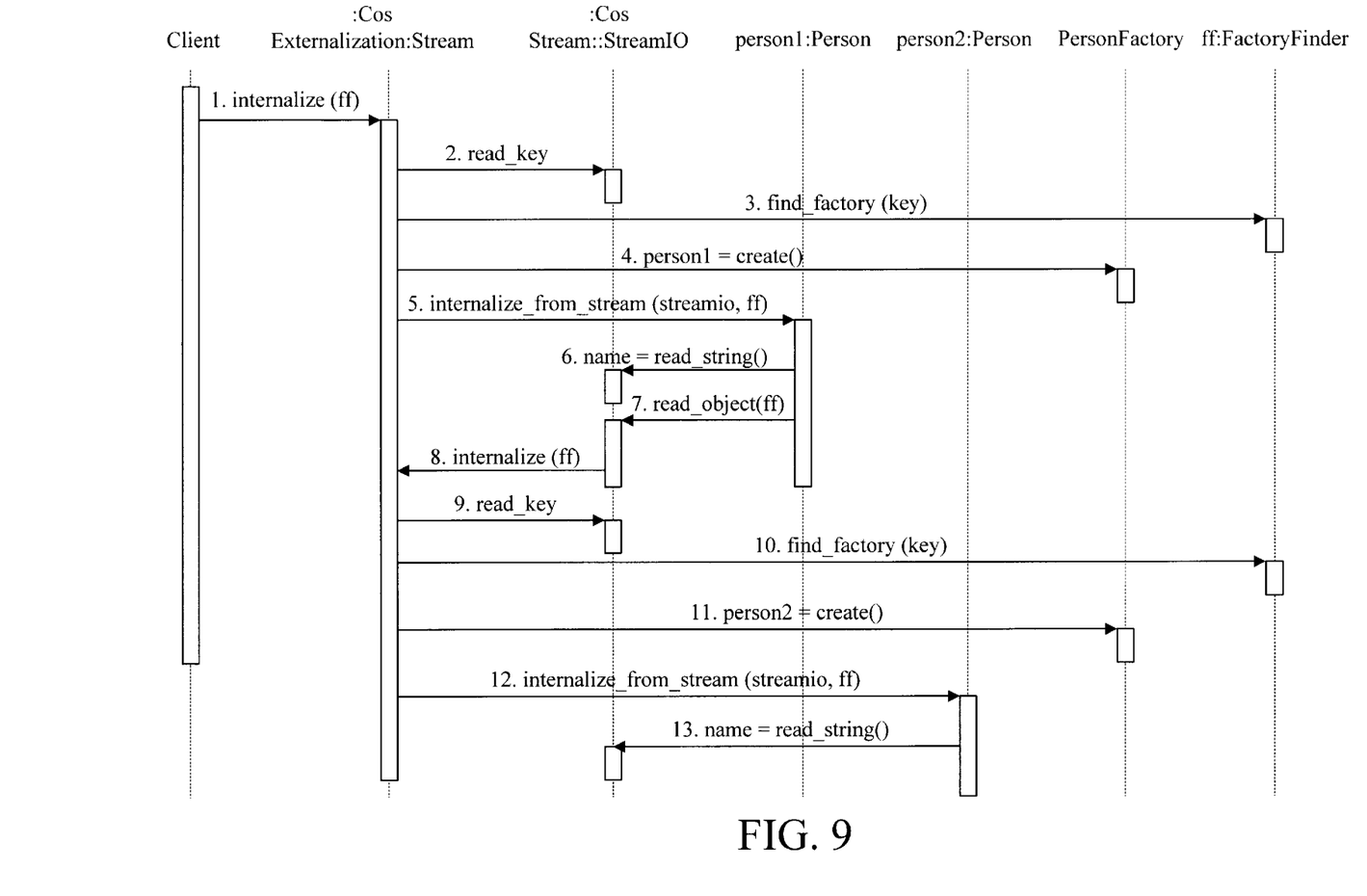
FIG. 9 is an interaction diagram which illustrates the current internalization procedures of CORBA.

Referring now to FIG. 9, an interaction diagram for the present internalization method architected in the CORBA specification is presented. The CORBA specification describes this process and the existing internalization process is well known to those skilled in the art.

Figure 10:
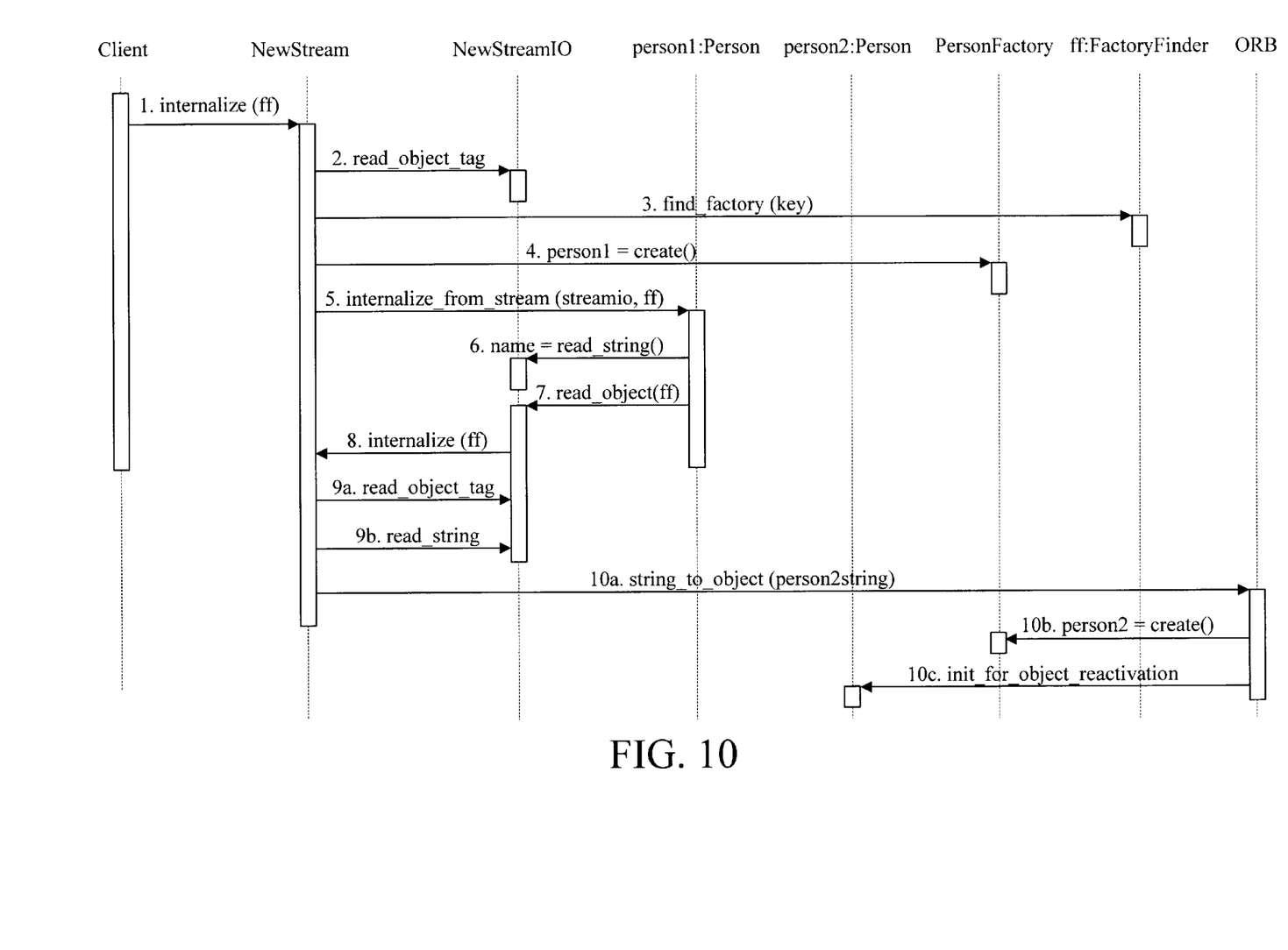
FIG. 10 is an interaction diagram which illustrates an internalization procedure in accordance with a preferred embodiment of the present invention.

Referring now to FIG. 10, an interaction diagram for an internalization method in accordance with a preferred embodiment of the present invention is described. In FIG. 10, it is assumed that the objects to be internalized were previously externalized in accordance with the methods outlined above in conjunction with FIG. 8. In addition, it is assumed that the original two objects, person1 and person2, have been removed from main memory. In FIG. 10, the client is assumed to have a reference to a NewStream object and this NewStream object contains a NewStreamIO object. The NewStreamIO object has been created or configured by the client object such that it contains a buffer with all the data in it that was generated as a result of the steps shown above in FIG. 8. In addition, the client object has created or has otherwise obtained a reference to a FactoryFinder object. The details of the operation of the FactoryFinder are fully described in the OMG Naming Service and the OMG Life Cycle Service and are well known to those skilled in the art.

Step 1. The client calls the internalize( ) method on the NewStream object, passing the factory finder(ff) as a parameter.

Step 2. The NewStream::internalize method first reads the object "tag" information from the stream using the read_object_tag( ) method on the NewStreamIO. In this case the tag information (for the person1 object) returns the Key and indicates that the state data for the object is stored in the stream.

Step 3. The internalize method uses the Key to find a factory suitable for constructing the person1 object by invoking the find_factory( ) method on the ff:FactoryFinder object, passing the Key as a parameter. The ff:FactoryFinder object returns the factory to the NewStream object.

Step 4. The internalize method uses the appropriate factory to create a new object from the Person class, the person1 object, by invoking the create( ) constructor method on the PersonFactory class.

Step 5. The internalize( ) method calls the internalize_from_stream( ) function on the person1 object and passes it the reference to the NewStreamIO object and to the factory finder in case it is needed to find factories for the objects contained within the person1 object (which is not necessary in this example).

Step 6. The internalize_from_stream( ) method (like externalize_from_stream( )) is declared by the Streamable class, however, since this is also an abstract mix-in class, the method is not implemented there. The method must be implemented in each class that inherits from Streamable, which in this case is the Person class. The implementation of the internalize_to_stream( ) method in the Person class calls two things (because the Person contains two data members). First, the read_string( ) method is invoked to read the name of the person from the stream. The second method is called in step 7 below.

Step 7. Next the internalize_from_stream( ) method calls read_object( ) to read the person2 object from the stream.

Step 8. The NewStreamIO read_object( ) method simply calls the internalize( ) method of the NewStream class.

Step 9. The internalize( ) method is already described in steps 1 through 5 above. As in step 2, the internalize method first reads the object tag information from the stream using the read_object_tag method on the NewStreamIO. However, in this case the tag information (for person2) indicates that the stringified reference to the object is stored in the stream. The internalize( ) method also reads the stringified object reference from the stream using the read_string( ) method on the NewStreamIO object.

Step 10. The internalize method( ) calls the string_to_object( ) method using the stringified reference as the parameter and the ORB will locate the server process from which the stringified reference came and start that server process, if necessary. The reference manager examines the string and looks up the uuid in its object reference table. If the reference is NOT contained in the object reference table, then the reference manager will return an error. If the reference is contained in the object reference table, then that indicates that the object itself is known to the reference manager and that the object either currently resides in memory or previously resided in memory. If the object is currently in memory, the reference manager simply returns a pointer to the object (in the case of a remote reference manager, this may involve creating a proxy).

As explained earlier in conjunction with FIG. 8, in this example the requested object does not currently reside in memory. The reference manager, therefore, must recreate an object using the class information from the object reference table. Then the reference manager assigns the proper uuid to the person2 object. The reference manager will call the init_for_object_reactivation( ) on the person2 object and pass it a pointer to the data in the data structure. The init_for_object_reactivation( ) method will then restore the state data for the person2 object, for example, using the CORBA Persistent Object Service, and it will also restore any security information for the object using the appropriate CORBA-defined security service. When the person2 object is fully reconstructed (reactivated) then the string_to_object( ) method returns a reference pointer to it. The reference to the person2 object is returned by internalize (in step 8) and by read_object( ) (in step 7) to the internalize_from_stream( ) method. In the internalize_from_( ) method the person2 object is assigned to a data member in person1. Finally, the internalize( ) method (started in step 1) returns a pointer to the person1 object to the client.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while the externalization of objects has been described in the context of persistent objects, any other type of object service that utilizes externalization may also benefit from the present invention.

We claim:

1. An apparatus comprising:
   at least one processor;
   a memory coupled to the at least one processor;
   a first object that resides in the memory and that has a persistent reference to a second object that resides in the memory; and
   an object reference manager that resides in the memory and that converts the persistent reference to the second object to a stringified object reference and that stores the state data of the first object and the stringified object reference in a data stream in the memory.

2. The apparatus of claim 1 wherein the object reference manager comprises an extension to the CORBA externalization framework.

3. The apparatus of claim 1 wherein the object reference manager restores the first object by creating a third object, by reading the data stream for the first object from the memory, by putting the state data from the data stream into the third object, and by providing a pointer within the first object to the second object.

4. The apparatus of claim 3 wherein the third object is substantially functionally equivalent to the first object.

5. A method for managing persistent references, the method comprising the steps of:

(A) recognizing when a first object has a persistent reference to a second object;

(B) saving the first object by performing the steps of:
  (1) converting the persistent reference to the second object to a stringified object reference;
  (2) storing the state data for the first object in a data stream, wherein the state data for the first object includes the stringified object reference to the second object; and
  (3) storing the data stream in the memory.

6. The method of claim 5 wherein the method steps are performed by an extension to the CORBA externalization framework.

7. The method of claim 6 wherein step B overrides the CORBA-defined methods for handling object references.

8. The method of claim 5 further comprising the step of:
(C) restoring the first object by performing the steps of:
  (1) creating a third object;
  (2) reading the data stream for the first object from the memory;
  (3) putting the state data from the data stream into the third object; and
  (4) providing a pointer within the third object to the second object.

9. The method of claim 8 wherein, after performing steps 1–4 in step C, the third object is substantially functionally equivalent to the first object.

10. A program product comprising:
an object reference manager that recognizes when a first object contains a persistent reference to a second object, and that saves the first object by converting the persistent reference to the second object to a stringified object reference, by converting the state data for the first object into a data stream, wherein the state data for the first object includes the stringified object reference to the second object, and by storing the data stream in the memory; and
signal bearing media bearing the object reference manager.

11. The program product of claim 10 wherein the signal bearing media comprises recordable media.

12. The program product of claim 10 wherein the signal bearing media comprises transmission media.

13. The program product of claim 10 wherein the object reference manager restores the first object by creating a third object, by reading the data stream for the first object from the memory, by putting the state data from the data stream into the third object, and by providing a pointer within the third object to the second object.

14. The program product of claim 13 wherein the third object is substantially functionally equivalent to the first object.

15. An apparatus comprising:
at least one processor;
a memory coupled to the at least one processor;
an object oriented framework mechanism residing in the memory and executed by the at least one processor, the framework mechanism providing class definitions to support transactions in a distributed object environment;
an object oriented extension to the framework mechanism, the extension residing in the memory, the extension recognizing when a first object contains a persistent reference to a second object, and saving the first object by converting the reference to the second object to a stringified object reference, by converting the state data for the first object into a data stream, wherein the state data for the first object includes the stringified object reference to the second object, and by storing the data stream in the memory.

16. A method for handling persistent references in an object-oriented environment, the method comprising the steps of:
(A) creating a first object in a memory, the first object being described by state data stored in the first object;
(B) creating a second object in the memory, the second object being described by state data stored in the second object;
(C) establishing a reference from the first object that references the second object;
(D) storing the reference to the second object in the first object;
(E) converting the reference to the second object to a stringified object reference;
(F) storing the state data that describes the first object and the stringified object reference in a single data stream in the memory;
(G) removing the first object from the memory;
(H) creating a third object which resides in the memory;
(I) retrieving the data stream that describes the first object and the stringified reference from the memory;
(J) storing the state data that describes the first object in the second object so that the third object has the operational functionality of the first object; and
(K) using the stringified object reference to establish a pointer from the third object to the second object.

17. The method of claim 16 wherein the method wherein the method steps are performed by an extension to the CORBA externalization framework.

18. The method of claim 17 wherein steps E, F, and K override the CORBA-defined methods for handling object references.

19. The method of claim 16 wherein the third object, after performing steps A–K, is functionally equivalent to the first object.

20. An apparatus comprising:
at least one processor;
a memory coupled to the at least one processor;
a first object that resides in the memory and that has a persistent reference to a second object that resides in the memory;
an object reference manager that resides in the memory and that converts the persistent reference to the second object to a stringified object reference and that stores the state data of the first object and the stringified object reference in a data stream in the memory, and that removes the first object from the memory and that restores the first object by creating a third object, by reading the data stream for the first object from the memory, by putting the state data from the data stream into the third object, and by using the stringified object reference to provide a pointer within the third object to the second object, and wherein the third object is functionally equivalent to the first object.

* * * * *